S. H. GARST.
METHOD OF SOIL TILLAGE.
APPLICATION FILED NOV. 22, 1920.
1,396,037.
Patented Nov. 8, 1921.
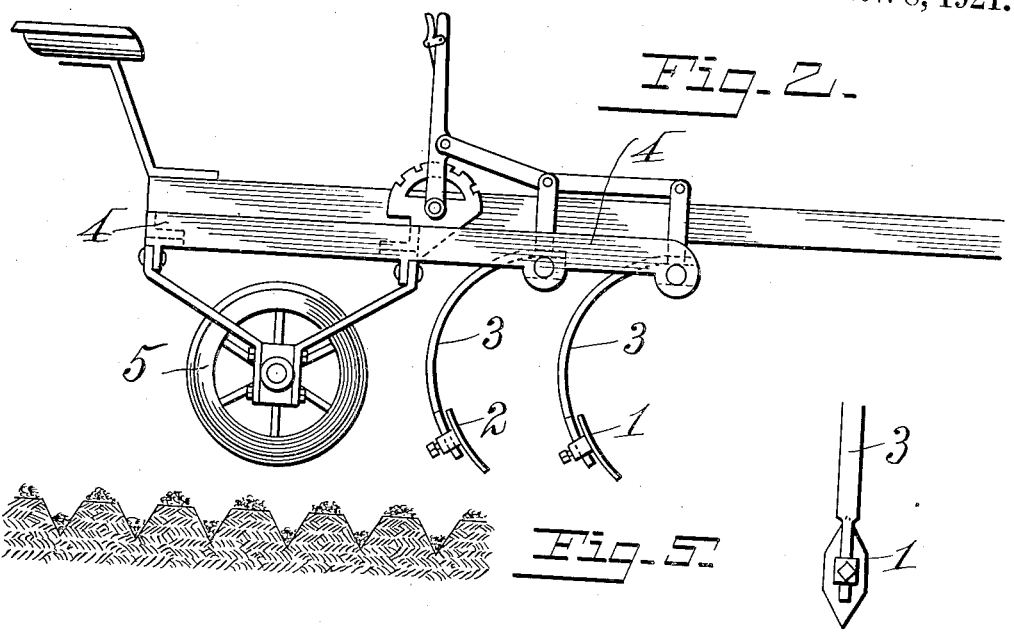
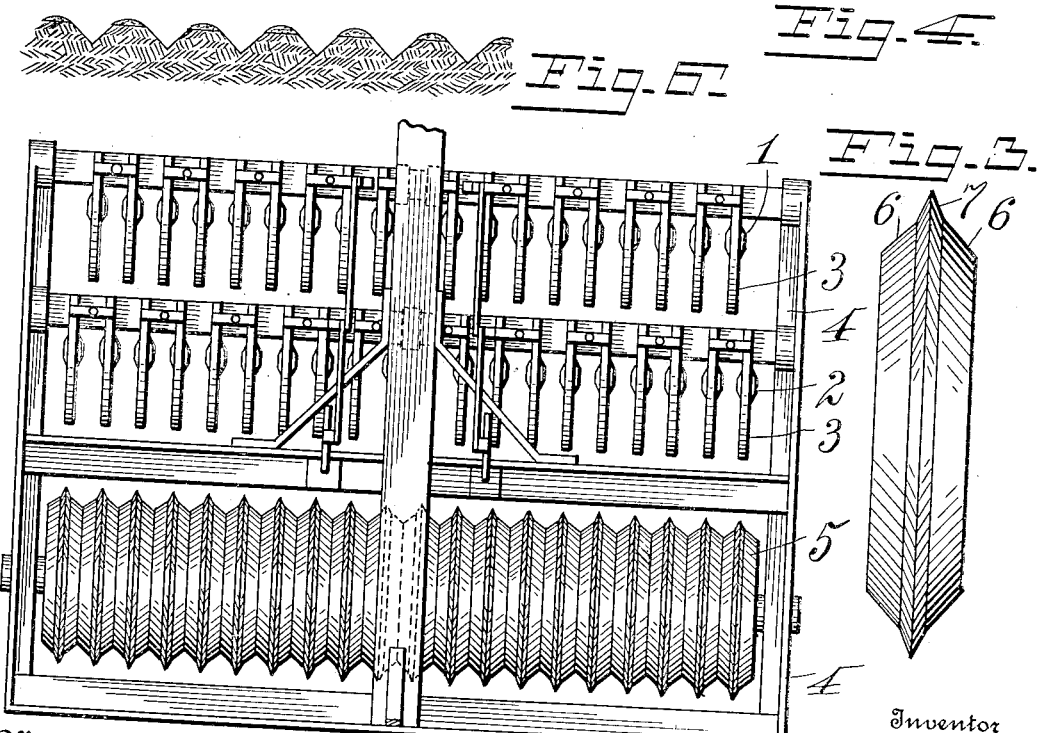
Inventor
S. H. GARST.
Witness

UNITED STATES PATENT OFFICE.

STEPHEN H. GARST, OF MOLINE, ILLINOIS.

METHOD OF SOIL-TILLAGE.

1,396,037.　　　　　Specification of Letters Patent.　　Patented Nov. 8, 1921.

Application filed November 22, 1920. Serial No. 425,680.

*To all whom it may concern:*

Be it known that I, STEPHEN H. GARST, a citizen of the United States, residing at Moline, in the county of Rock Island and State of Illinois, have invented certain new and useful Improvements in Methods of Soil-Tillage, of which the following is a specification, reference being had therein to the accompanying drawing.

This invention relates to a method of soil tillage.

The object of the invention is to provide a method of tillage whereby the soil will be thoroughly loosened and the surface thereof left in a condition to receive the most beneficial effects of the action of the air and the gases therein, as well as of the rain, sunshine and wind.

To this end a further object of the invention is to provide a method of tillage whereby the surface of the soil will be formed into a series of relatively narrow but uniform furrows and ridges, the ridges being formed throughout the well tilled soil and projecting above the original level of the surface of the soil, and being packed, or compressed, to enable them to withstand the action of the elements.

Other objects of the invention will appear as the same is described in detail.

In the accompanying drawings I have illustrated one form of apparatus by means of which my invention may be carried out and Figure 1 is a top plan view of such an apparatus; Fig. 2 is a side elevation of the same; Fig. 3 is a detail view of one of the pulverizing wheels; Fig. 4 is a detail view of one of the furrow forming implements; Fig. 5 is a sectional view of the surface of the soil showing the furrows and ridges before they are acted upon by the pulverizing, or packing wheels; and Fig. 6 is a similar view showing the furrows and ridges after they have been acted upon by the pulverizing wheels.

By the method of tillage in most common use the surface of the soil is reduced to a relatively fine condition and smoothed off to produce as level a surface as is practical, this being accomplished by the use of cutting and crushing implements, such as harrows, pulverizers, cultivators, and the like. This treatment of the soil leaves the same in such a condition that the falling rain melts and packs the particles of soil into a compact mass, which, when dried by the sunshine and wind forms a substantially air tight crust which seals the undersoil from the heat of the sun and gases of the air and greatly retards the drying out of the same so that it will frequently remain wet and cold for a very long period of time after a heavy rain. Moreover, when this crust forms after the seed has been planted it interferes seriously with the growth of the plants as the tender stems of the plants can not easily force their way through this hard crust, and when the plants have grown above the level of the crust the subsequent cultivation thereof is liable to cause injury to the plants, because the crust when acted upon by the pulverizer or tooth of a cultivator will break into large pieces, or flakes, which are liable to cover up or break the small plants. Further, these pieces, or flakes, of hard crust are not easily broken up and they can not be readily pulverized to provide the fine soil required by the young plants.

It has been proposed heretofore to form the surface of the soil into a series of narrow furrows and ridges, but this has been done by the use of an implement which rolls over the surface of the soil and forms the furrows and ridges by downward pressure. The ridges formed in this manner are hard and overpacked, the surface clods only are crushed and the ridges often are not full. Further, if the surface of the soil is hard or crusted the furrow forming devices or wheels frequently will not penetrate the surface sufficiently to properly form the furrows and this portion of the soil, which most needs tilling, is not adequately worked.

In carrying out my method of tillage I loosen the soil and form therein a series of relatively narrow furrows and ridges, the furrows being formed by removing the soil and displacing the same laterally so that it will be piled in the spaces between the respective furrows and will project above the original level of the surface of the soil. The sides and tops of the ridges are then compressed or packed to such an extent that they will be able to withstand the action of the elements; but not sufficiently to prevent the circulation of air and moisture through the same. Preferably after the first series of furrows and ridges have been formed a second series of furrows is formed between the ridges of the first series, the soil from the furrows of the second series being removed and displaced laterally to fill up the first furrows and to cause the soil to be piled in the intervening spaces between the respective furrows to a height somewhat above the original level of the surface of the soil and in this manner the whole surface of the soil is thoroughly loosened and the ridges are formed throughout of well tilled soil. The sides and tops of the ridges are then packed, or compressed, as stated, and the clods in the furrows, or ridges, are crushed while still soft so that the whole surface of the soil is reduced to a finely pulverized condition.

The method may be carried out by any suitable apparatus and in the accompanying drawings I have illustrated one apparatus which is highly efficient for this purpose. The apparatus here shown comprises two series of soil working or furrow forming devices, such as relatively narrow shovels 1 and 2. These soil working devices, or shovels, are here shown as carried by drag bars 3 depending from a frame 4. The shovels 1 of the first series are arranged short distances apart, preferably these distances being such that the spaces between the furrows will be approximately equal to the width of the furrows at their tops, that is, at the original level of the soil. These shovels as they are moved through the soil remove portions thereof to form the furrows and the soil which is removed from these furrows is displaced laterally and piled upon the intervening spaces between the several furrows. The soil working devices, or shovels 2 of the second series are also relatively narrow and are spaced apart substantially the same distances that the shovels of the first series are spaced apart, and are arranged in staggered relation to the shovels of the first series so that they will act upon the soil between the furrows of the first series and will displace this soil to form a second series of furrows. The soil from this second series of furrows is also displaced laterally so as to fill the furrows of the first series and to form ridges which will project above the original level of the surface of the soil. In this manner the whole surface of the soil is thoroughly loosened and the ridges are formed throughout of well tilled soil. Mounted on the frame 4 in the rear of the second series of shovels 2 is a gang of pulverizer wheels 5 which, as here shown, are arranged in axial alinement with their adjacent sides in contact. These pulverizer wheels are provided with radial converging peripheral surfaces 6 which give the periphery of the wheel a substantially V-shape and at the apex of this V-shaped periphery each wheel is provided with a circumferential rib 7 which projects beyond and at an angle to the peripheral surfaces 6. These pulverizer wheels are arranged in line with the respective shovels of the second series so that they will follow directly in the furrows of the second series. The converging peripheral walls of these wheels act upon the sides of the ridges to compress the soil in the ridges and provide the same with firm surfaces and, further, to crush the clods in the ridges and in the furrows. Inasmuch as the walls of the adjacent wheels are in close contact one with the other the upper portions of the peripheral walls will act upon the tops of the ridges so that the tops are packed, as well as the sides. The circumferential ribs, or blades, 7 not only crush the clods which may have fallen back into the bottoms of the furrows, but they cut through the bottoms of the furrows so as to further loosen the soil below the furrows. This apparatus, which is here shown for the purpose of illustration only, forms no part of the present invention but is embodied in my copending application for patent, Serial No. 268,007, filed Dec. 23, 1918.

This method of tillage, when carried out as above described, serves to loosen the soil, to level off the same, to destroy surface vegetation and crust, and to form furrows separated one from the other by ridges formed throughout of loose soil, packed on the sides and tops sufficiently to enable the same to withstand the action of the elements, but to permit them to be thoroughly ventilated. Preferably, but not necessarily, the several steps of the method are carried out by a single machine, such as that above described, so that the complete tilling of the soil is performed at a single operation, thereby saving much time and labor.

When the soil has been tilled by the foregoing method it is left in such a condition that the falling rain will not batter down the surface of the ridges because the drops of rain will strike the inclined sufaces of the ridges glancing blows, thereby reducing its force, and as the drops of rain move down the sides of the ridges they will carry with them small particles of soil which will reduce the thickness of any crust which might otherwise have a tendency to form on the sides of the ridges. The upwardly projecting ridges expose a relatively large surface of the soil to the action of the sunshine and air. The water will drain out of the ridges quickly so that they wll dry out by gravity as well as evaporation and the soil will become dry enough to work in a relatively short time after a heavy rain or spell of wet weather. The crust, if any, on the sides of the ridges is thin and easily broken and as the surfaces of the ridges dry out by the heat of the sun and the action of the air and wind a rapid contraction of the surface takes place which will cause to be formed therein numerous fine cracks, which permit the thorough ventilation of the ridges and enables the same to derive the greatest benefit from the action of the air and the gases contained therein.

Further, this method of tillage divides the field into a large number of well defined, relatively deep, furrows so that the rain fall is divided into as many small streams as there are furrows and the water is thus kept from collecting in large bodies and because of lack of volume it will have little or no tendency to wash out the surface of the soil and to form gullies. Further, the rain fall being divided into a large number of small streams will tend to move with much less rapidity than where it collects in large volumes and, consequently, a much larger quantity of the water will be absorbed by the soil. By running the furrows and ridges at an angle or transversely to the slope of a hillside, or other inclined surface, the flow of the water is retarded to a still greater extent and more time is allowed for the absorption of the same by the soil, thereby providing a more equal distribution of the rain fall and insuring that the high parts of the field will retain a more equal portion of the water.

Further, the ridges being formed throughout of loosened soil are more uniform in their character and will settle uniformly. Consequently, there is much less tendency for the upper portions of the ridges to be washed off or displaced by rain and wind than where the soil from the ridges is piled upon a relatively hard, firm space between the ridges. The soil, which has thus been tilled, is left in an ideal condition for planting, either immediately or at a subsequent time, as the surface will not become caked, or crusted, and the soil will dry out quickly after a rain fall.

While I have described my method of soil tillage I wish it to be understood that I do not desire to be limited to the details thereof as obvious variations may occur to a person skilled in the art.

Having now fully described my invention what I claim as new and desire to secure by Letters Patent, is:

1. The method of tilling soil which consists in forming in the surface of the soil a series of relatively narrow furrows which are separated one from the other by ridges of soil projecting above the original level of the surface of the soil, and in packing the sides of said ridges to enable them to withstand the action of the elements.

2. A method of tilling soil which consists in first loosening the soil along a series of parallel lines, forming furrows between said lines of loosened soil, the soil removed from said furrows being piled on the loosened soil in the intervening spaces to form ridges, and then packing the sides of said ridges.

3. The method of tilling soil which consists in loosening the soil and forming therein a plurality of relatively narrow furrows, said furrows being spaced short distances one from the other and the soil from said furrows being piled in the spaces between the respective furrows to form ridges projecting above the original level of the surface of the soil, and then compressing the soil in said ridges and crushing the clods in said furrows.

4. The method of tilling soil which consists in loosening the whole surface of the soil, forming therein a plurality of relatively narrow furrows spaced short distances apart, piling the soil removed from said furrows on the loosened soil in the spaces between the respective furrows to form ridges projecting above the original level of the surface of the soil and formed throughout of well tilled soil, and then packing the sides and tops of said ridges to enable them to withstand the elements.

5. The method of tilling soil, which consists in forming in the surface of the soil a series of relatively narrow furrows spaced apart substantially equal distances, then forming a second series of furrows between the furrows of the first series, the soil removed from the furrows of the second series being piled in the spaces between the same to form ridges which project above the original level of the surface of the soil, and then compressing the soil in said ridges.

In testimony whereof, I affix my signature hereto.

STEPHEN H. GARST.